ately to lock the retractor during all times when the belt locking means are engaged. An external tongue protruding through the boot is operable to move the moveable member between belt locking and belt unlocking positions. Such external tongue can be disposed to exit on either the top or bottom of the boot.

United States Patent [19]
Anthony et al.

[11] Patent Number: 4,651,946
[45] Date of Patent: Mar. 24, 1987

[54] BELT RETRACTOR WITH BELT RETRACTION LOCK

[75] Inventors: James R. Anthony, Carmel; David Merrick, Indianapolis, both of Ind.

[73] Assignee: Indiana Mills & Manufacturing, Inc., Carmel, Ind.

[21] Appl. No.: 793,954

[22] Filed: Nov. 1, 1985

[51] Int. Cl.⁴ .............................................. B60R 22/34
[52] U.S. Cl. ........................... 242/107.2; 242/107.4 D
[58] Field of Search ..................... 242/107.4 D, 107.2; 280/807, 808; 297/476, 479

[56] References Cited

U.S. PATENT DOCUMENTS 3,598,335  8/1971  Seeger .......................... 242/107.4 D
3,598,336  8/1971  Frost ............................. 242/107.4 D Primary Examiner—John M. Jillions
Attorney, Agent, or Firm—Woodard, Weikart, Emhardt & Naughton

[57] ABSTRACT

An automatic belt retractor mounted within a boot having belt retraction locking means mounted within the boot to lockingly but releasably engage the belt to counterbalance the spring bias retraction of the retractor spool. The belt locking means includes a base member with a tongue disposed toward the belt and a moveable member slideably received by the base member also with a tongue disposed toward the belt, the belt being disposed between the base and moveable members. Such members define a belt locking position when their respective tongues are aligned to arrest the belt therebetween, preventing the retractor from cinching up the belt upon repeated momentary loosenings of the tension upon the belt. Concurrently, such moveable member's rigid rod engages the retractor's rotatable cam plate and is operable to rotate such cam plate manually to lock the retractor during all times when the belt locking means are engaged. An external tongue protruding through the boot is operable to move the moveable member between belt locking and belt unlocking positions. Such external tongue can be disposed to exit on either the top or bottom of the boot.

10 Claims, 13 Drawing Figures

BELT RETRACTOR WITH BELT RETRACTION LOCK

BACKGROUND OF THE INVENTION

1. Field of the Invention

This invention is in the field of retractors typically used for seat belts.

2. Description of the Prior Art

Many patents have been issued that disclose a variety of automatic retracting devices that include a spring biased spool for withdrawing a webbed belt into the retractor, but yieldable to permit the webbed belt to be withdrawn from the spool for attachment at the opposite end to a buckle or tongue. Typically, the prior art retracting spools include ratchet configured end plates that are lockingly engaged by a spring biased pawl bar pivotally mounted to the retractor housing. The various mechanisms of the retractors, including specifically a clutch plate that is in direct contact with the pawl bar, hold the pawl bar out of the locking position until the retractor is slightly rewound, at which time the clutch plate rotates with the retractor spool and permits the locking pawl bar to pivot and lockingly engage the retractor spool in ratchet and engaging pawl fashion. Once the locking bar is allowed to pivot into the locking position, the retractor is operable to prevent further withdrawal of the webbed belt from the retractor spool, but the retractor spool's ratchet configured end plates and the locking pawl bar remain operable to permit retraction of the webbed belt into the retractor. Thus, if more than the desired amount of webbed belt material is withdrawn from the retractor while attaching the opposite end of the belt to a tongue or buckle, the spool will rewind under the spring bias, applying a snug tension to the webbed belt, and the locking bar will simultaneously lockingly engage the retractor spool, preventing further withdrawal of the webbed belt from the retractor. If the snug tension upon the webbed belt is released to any appreciable degree, the spring bias upon the spool will operate to further withdraw the webbed belt into the retractor, and the ratchet and pawl relationship of the locking bar and retractor spool end plates will operate to lockingly engage the retractor spool after a snug tension has been reestablished, preventing re-withrawal of the webbed belt from the retractor.

It is known to provide the automatic retracting devices described above as restraining devices, or seat belts, in moving vehicles of all types. In seat belt applications of the automatically retracting devices described above wherein the passenger is jolted or bounces in dramatic contrast to the ride experienced in the normal passenger automobile, such as in construction equipment and semitrailer cabs, the snug tension upon the webbed belt experienced when the vehicle is at rest can be repeatedly eased as a result of the passenger's kinetics. With each downward jolt or bounce, the snug tension on the webbed belt can be loosened to such an extent that the spring biased retractor spool operates to withdraw additional webbed belt into the retractor until a snug tension is reestablished while simultaneously the ratchet and pawl relationship of the locking bar and spool end plates operates to prevent the additional webbed material withdrawn into the retractor from being re-withdrawn from the retractor as the passenger rebounds. The result is an uncomfortable tensioning of the webbed belt. The passenger must either remove the seat belt completely and resecure it upon each such occurrence, or the passenger must suffer continuing discomfort.

Disclosed herein is a belt locking mechanism for counterbalancing the spring bias of such an automatic retractor spool to deactivate the retractor spool's normal withdrawal mechanisms after the opposite end of the webbed belt has been attached to a tongue or buckle and has been snuggly tensioned, and the locking bar has lockingly engaged the retractor spool. Also disclosed is an integral pushrod mechanism operable to rotate the cam plate to the extent necessary to allow the pawl bar to lockingly engage the retractor spool simultaneously with the engagement of the belt locking mechanism. Absent such a pushrod mechanism, it might be possible for the webbed belt to be forcibly withdrawn even though the belt locking mechanism is engaged with the belt. The retractor spool is thus prevented from withdrawing even to the slight degree necessary to rotate the cam plate to permit the retractor pawl to lockingly engage the retractor spool.

It is also known to provide automatic retracting devices for such use encased in plastic boots. The new and improved retracting device disclosed herein is described in combination with such an automatic restraining device with seat belt encased in such a plastic boot.

SUMMARY OF THE INVENTION

One embodiment of the present invention is an automatic belt retractor with belt retraction lock for installation in a motor vehicle, comprising a boot, a belt, and an automatic belt retractor mounted within the boot and including a housing, a spring biased spool rotatably mounted within the housing wrappingly receiving the belt and normally urging the belt to a retracted condition but yieldable to permit withdrawal of the belt, the spool having end walls at least one of which is configured as a ratchet wheel, a spring biased pawl bar pivotally mounted within the housing moveable between a removed position and a locking position whereat the pawl bar lockingly engages the ratchet wheel limiting movement of the spool and withdrawal of the belt, a cam plate mounted within the housing adjacent one of the walls and rotatably moveable therewith upon withdrawal of the belt to a first position whereat the cam plate contacts and blocks movement of the pawl bar to the locking position, and moveable therewith upon slight retraction of the belt to a second position whereat the cam plate disengages contact and allows movement of the pawl bar to the locking position; and a belt retraction locking means mounted within the boot to lockingly but releasably engage the belt counterbalancing the spring bias of the spool and deactivating the spool's normal urging of the belt to a retracted condition; and cam-rotating means to lockingly but releasably rotate the cam plate to the second position concurrently with the belt retraction means lockingly engaging the belt.

Another embodiment of the present invention is an automatic belt retractor with belt retraction lock for installation in a motor vehicle, comprising a frame, a belt, and an automatic belt retractor mounted to the frame and including a housing, a spring biased spool rotatably mounted within the housing wrappingly receiving the belt and normally urging the belt to a retracted condition but yieldable to permit withdrawal of the belt, the spool having end walls at least one of which is configured as a ratchet wheel, a spring biased pawl bar pivotally mounted within the retractor moveable between a removed position and a locking position whereat the pawl bar lockingly engages the ratchet wheel limiting movement of the spool and withdrawal of the belt, a cam plate mounted within the retractor adjacent one of the walls and rotatably moveable therewith upon withdrawal of the belt to a first position whereat the cam plate contacts and blocks movement of the pawl bar to the locking position, and moveable therewith upon slight retraction of the belt to a second position whereat the cam plate disengages contact and allows movement of the pawl bar to the locking position; and belt retraction locking means mounted to the frame to lockingly but releasably engage the belt counterbalancing the spring bias of the spool and deactivating the spool's normal urging of the balt to a retracted condition; and means to lockingly but releasably rotate the cam plate to the second position concurrently with the belt retraction means lockingly engaging the belt.

Another embodiment of the present invention is an automatic belt retractor with belt retraction lock for installation in a motor vehicle, comprising a belt, and an automatic belt retractor including a housing, a spring biased spool rotatably mounted within the housing wrappingly receiving the belt and normally urging the belt to a retracted condition but yieldable to permit withdrawal of the belt, the spool having end walls at least one of which is configured as a ratchet wheel, a spring biased pawl bar pivotally mounted within the retractor moveable between a removed position and a locking position whereat the pawl bar lockingly engages the ratchet wheel limiting movement of the spool and withdrawal of the belt, a cam plate mounted within the retractor adjacent one of the walls and rotatably moveable therewith upon withdrawal of the belt to a first position whereat the cam plate contacts and blocks movement of the pawl bar to the locking position, and moveable therewith upon slight retraction of the belt to a second position whereat the cam plate disengages contact and allows movement of the pawl bar to the locking position, and belt retraction locking means to lockingly but releasably engage the belt counterbalancing the spring bias of the spool and deactivating the spool's normal urging of the belt to a retracted condition.

Another embodiment of the present invention is a belt retractor lock for use with a retractor having a cam operable to lockingly but releasably engage a retractor-locking pawl and having a belt wound thereon, comprising belt retraction locking means including a base member slideably receiving a moveable member between which the belt is disposed and is slidingly passable, a first tongue mounted to the base member extending toward the moveable member and a second tongue mounted to the moveable member extending toward the base member, the base member and the moveable member defining a belt locking position when the second tongue is slideably aligned with the first tongue, the belt being arrested therebetween, and defining a belt unlocking position when the second tongue is slideably disaligned with the first tongue, the belt being slidingly passable therebetween; and cam-rotating means to lockingly but releasably rotate the cam to lock the retractor with the pawl concurrently with the belt retraction means lockingly engaging the belt including a rigid rod with a first end position and a second end position, the first end position mounted to the moveable member sidewall in closest proximity to the cam plate disposing the rod toward the cam plate, the second end position directly contacting the cam plate, the rod being moveable with the moveable member between the belt locking position and the belt unlocking position, the second end position rotating the cam plate lockingly to the second position as the moveable member is moved to the belt locking position and permitting the cam plate to releasingly rotate from the second position as the moveable member moves from the belt locking position to the belt unlocking position.

It is an object of the present invention to provide a new an improved belt retractor with belt retraction lock for typical use in seat belt applications.

It is a further object of the present invention to provide a belt unlocking mechanism for counterbalancing the spring bias upon the spools of automatic retracting devices to deactivate the retractor spool's normal belt withdrawal mechanisms after the opposite end of the belt has been attached to a tongue or buckle and has been snuggly tensioned, and the retractor's locking bar has lockingly engaged the retractor spool.

It is a further object of the present invention to provide an integral pushrod mechanism operable to manually rotate the cam plate of an automatic retractor device to the extent necessary to permit the retractor's pawl bar locking device to lockingly engage the retractor spool thereby preventing further withdrawal of the belt simultaneously with the engagement of the belt locking mechanism of the present invention.

Related objects and advantages of the present invention will be apparent from the following description.

DESCRIPTION OF THE PREFERRED EMBODIMENTS

Figure 1:
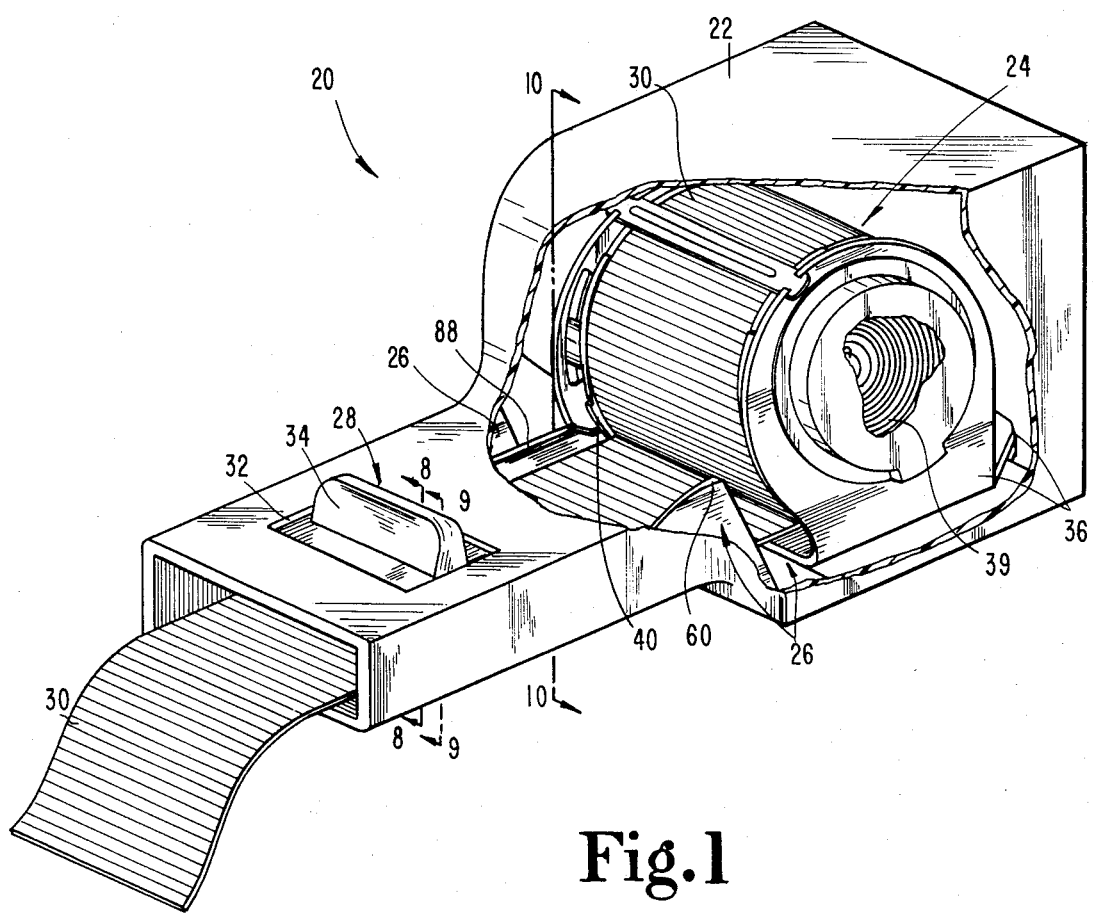
FIG. 1 is a perspective and partially segmented view of the preferred embodiment of the belt retractor with belt retraction lock that is the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, there is shown in FIG. 1 one embodiment of the belt retractor with retraction lock 20 that is the present invention. This embodiment is composed of a boot 22, shown partially fragmented in FIG. 1 to reveal an automatic belt retractor 24 mounted within the boot 22, a base member 26 located within the boot 22, a moveable member 28 located within the boot 22 and slideably received by the base member 26, and a webbed belt 30.

The boot 22 is well known to the prior art. Such boots are generally provided to encase belt retractor devices of varies types and for a variety of uses, including uses in which an automatic belt retractor 24 is used in moving vehicles as a seat belt retractor. Such boots are typically constructed of a sturdy yet pliable plastic material.

Figure 2:
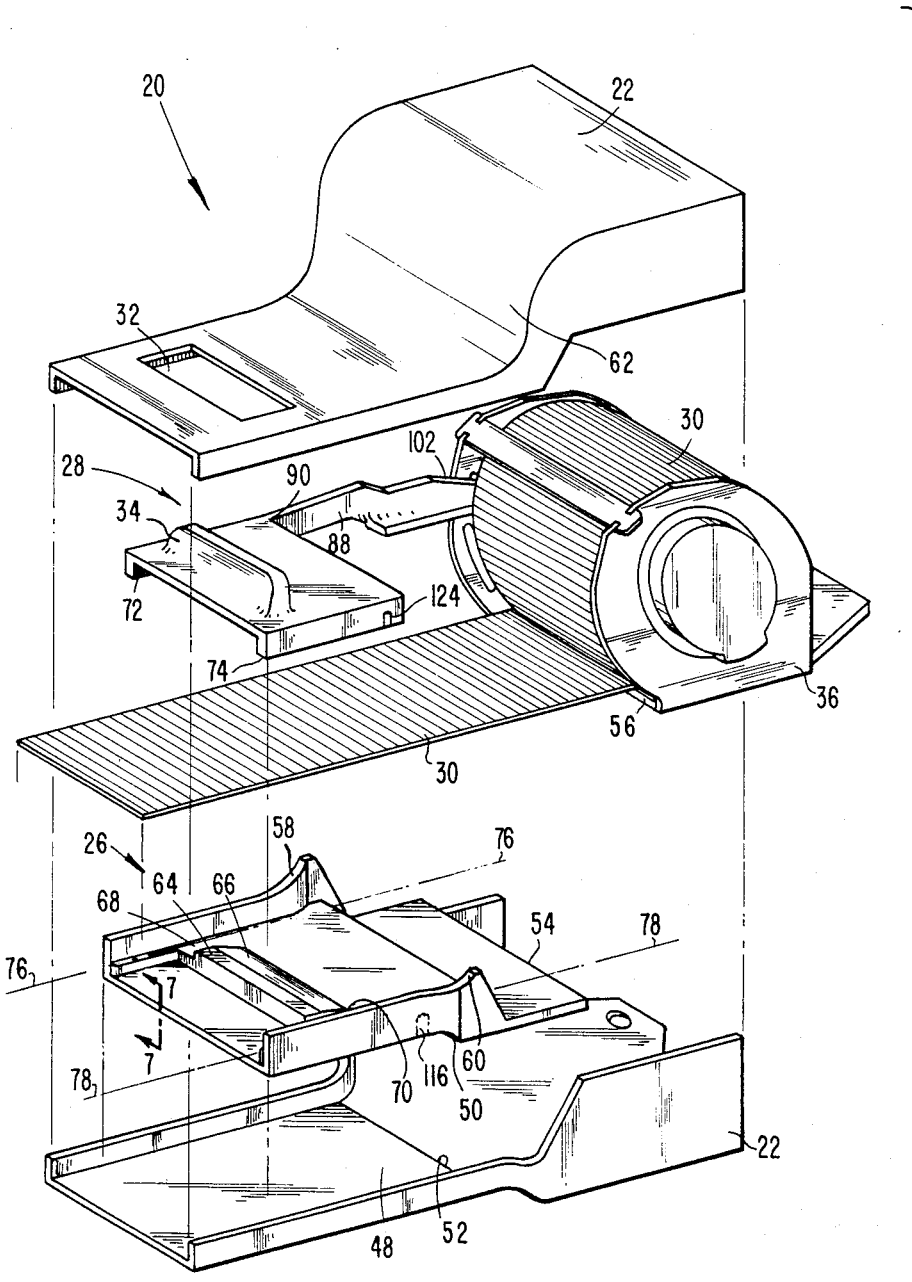
FIG. 2 is a perspective exploded view of the belt retractor with belt retraction lock of FIG. 1.

Referring to FIGS. 1 and 2, the boot 22 of the present invention has been modified to provide an opening 32 wide enough to receive tongue 34 of the moveable member 28, and long enough to permit tongue 34 to be moved laterally, and thus permitting the moveable member 28 to be moved laterally, between a belt locking and belt unlocking position to be described below.

The automatic belt retractor 24 is also well known to the prior art and is readily available from a variety of sources. An automatic belt retractor of this general type is disclosed in U.S. Pat. No. 3,667,698, which is incorporated herein by reference.

Figure 10:
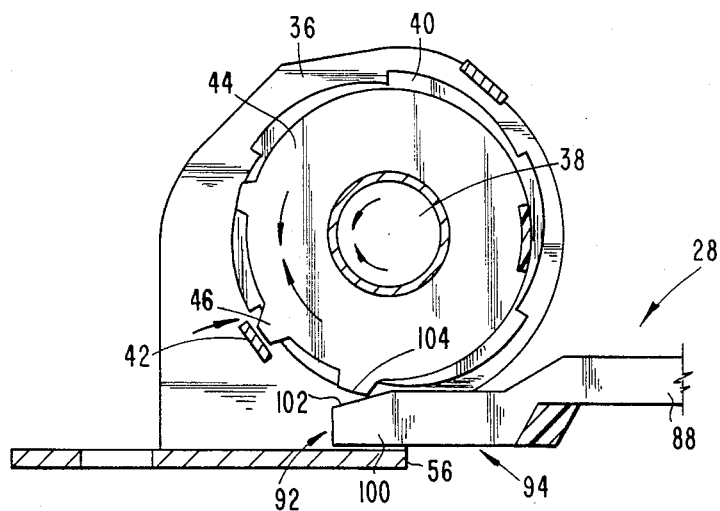
FIG. 10 is a fragmentary, cross-sectional view of the retractor 24 and the moveable member 28 of FIG. 1 taken along line 10—10 and viewed in the direction of the arrows.

Referring to FIGS. 1 and 10, it is well known to provide automatic belt retractors that include a housing 36 containing a spring biased spool 38, constantly under clockwise bias from spring 39, that is rotatably mounted within the housing 36 with the spring biased spool 38 being operable to wrappingly receive a belt 30, preferably a webbed belt of the type normally found in seat belt applications, yet the spring biased spool 38 being yieldable to permit the withdrawal of the belt 30. At least one of the end walls 40 of the spring biased spool 38 is configured as a ratchet wheel. A spring biased pawl bar 42 is pivotably mounted within the housing 36 of the automatic belt retractor 24. Referring to FIG. 10, the spring biased pawl bar 42 is moveable between a position removed from ratchet wheel 40, as shown in FIG. 10, and a locking position whereat the pawl bar 42 pivots in the direction of the arrow above the pawl bar 42 shown in FIG. 10 and lockingly engages the ratchet wheel end wall 40 thereby limiting the movement of the spool 38 in a counter-clockwise direction, and thereby preventing withdrawal of the belt 30 from the spring biased spool 38.

It is further well known to provide such an automatic belt retractor 24 with a cam plate 44 mounted within the housing 36 immediately adjacent to a ratchet wheel end wall 40 of the spring biased spool 38. The cam plate 44 is rotatable in a counterclockwise direction with ratchet wheel end wall 40 upon withdrawal of the belt 30 from the spring biased spool 38 into a first position, shown in FIG. 10, whereat a cam plate tab 46 contacts the pawl bar 42 and blocks movement of the pawl bar 42 into an engaging position with the ratchet wheel end wall 40, and thereby permitting withdrawal of the belt 30 from the spring biased spool 38 as it rotates counter-clockwise. Upon slight retraction of the belt 30 onto the spring biased spool 38, upon a slight clockwise rotation of the spring biased spool 38 under its bias from spring 39, the cam plate 44 also rotates clockwise with the ratchet wheel end wall 40 of the spring biased spool 38, through a predetermined distance, from the locking position shown in FIG. 10 such that cam tab 46 disengages contact with pawl bar 42 and pawl bar 42 then pivots and engages ratchet wheel end wall 40, preventing further counterclockwise rotation of the spring biased spool 38, thus preventing further withdrawal of the belt 30.

Referring again to FIG. 1, automatic retractor 24 is mounted to boot 22 by conventional means, such as a through bolt connecting the automatic retractor 24 with the boot 22 both of which are then secured by such through bolt to the frame of a vehicle; automatic retractor 24 is thereby located within boot 22 in the conventional position. Applicant has added the belt retraction locking means disclosed herein to such an automatic retractor 24 and boot 22.

Figure 6:
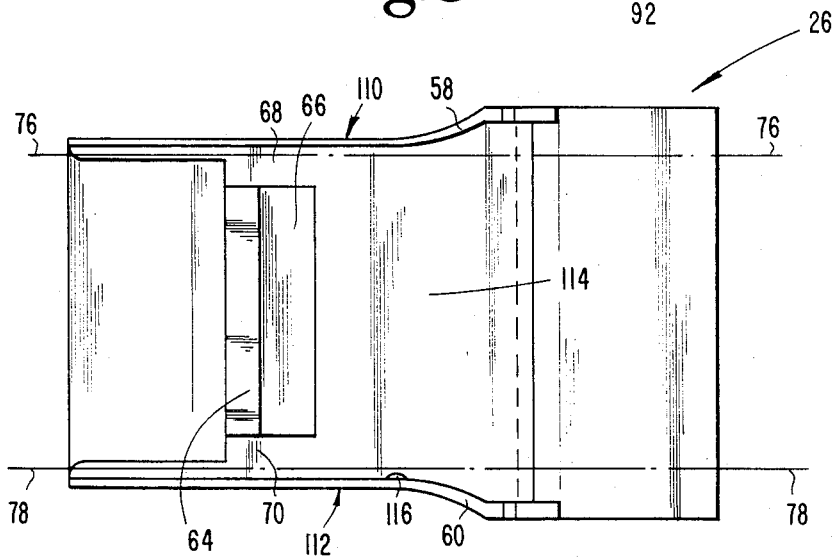
FIG. 6 is a top view of the base member 26 of FIG. 1.
Figure 7:
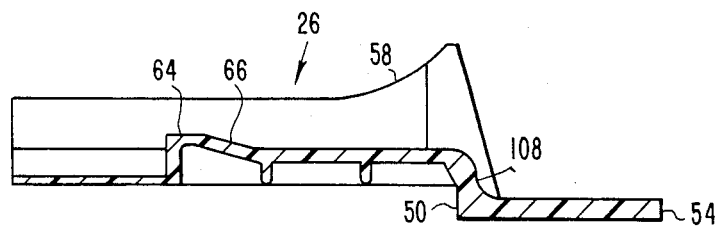
FIG. 7 is an enlarged cross-sectional side view of the base member 26 of FIG. 2 taken along line 7—7 and viewed in the direction of the arrow.

Referring to FIG. 2, the belt retraction locking means disclosed herein includes a base member 26 and a moveable member 28. Referring to FIGS. 2, 6, and 7, base member 26 is sized and configured to be snuggly received into the bottom support surface 48 of boot 22. The lateral dimensions and contours of base member 26 correspond to the interior lateral dimensions and contours of boot 22. Edge 50 of base member 26 abuts edge 52 of boot 22 thereby preventing base member 26 from sliding in the direction of the narrowest opening of boot 22, which is to the left in FIG. 2. Edge 54 of base member 26 abuts edge 56 of housing 36 of the automatic retractor 24 when automatic retractor 24 is secured to boot 22 in the conventional position as described above and shown in FIG. 1. Base member 26 is thereby prevented from sliding in the direction of the widest opening of boot 22, which is to the right in FIG. 2. Continuing to refer to FIGS. 2, 6, and 7, upwardly extending and outwardly projecting edges 58 and 60 of base member 26 are sized and contoured to abut the upwardly contouring surface 62 of boot 22, thereby preventing vertical movement of base member 26 when emplaced within boot 22 in the manner described.

Continuing to refer to FIGS. 2, 6, and 7, base member 26 is provided with a tongue 64 that includes a sloped surface 66 disposed toward the automatic retractor 24. Such tongue 64 is of a lateral dimension less than the corresponding interior lateral dimension of base member 26, thereby defining channels 68 and 70.

Referring to FIGS. 2, 3, 4, and 5, channels 68 and 70 of base member 26 slideably receive support surfaces 72 and 74 of two downwardly extending runners of moveable member 28. Moveable member 28 is sized and configured to be snuggly yet slideably received within base member 26. The lateral dimensions and contours of moveable member 28 correspond to the interior lateral dimensions and contours of base member 26. Referring to FIGS. 2 and 6, when moveable member 28 is positioned atop and within base member 26, support surface 72 of moveable member 28 lies atop line 76—76, and support surface 74 of moveable member 28 lies atop line 78—78.

Figure 3:
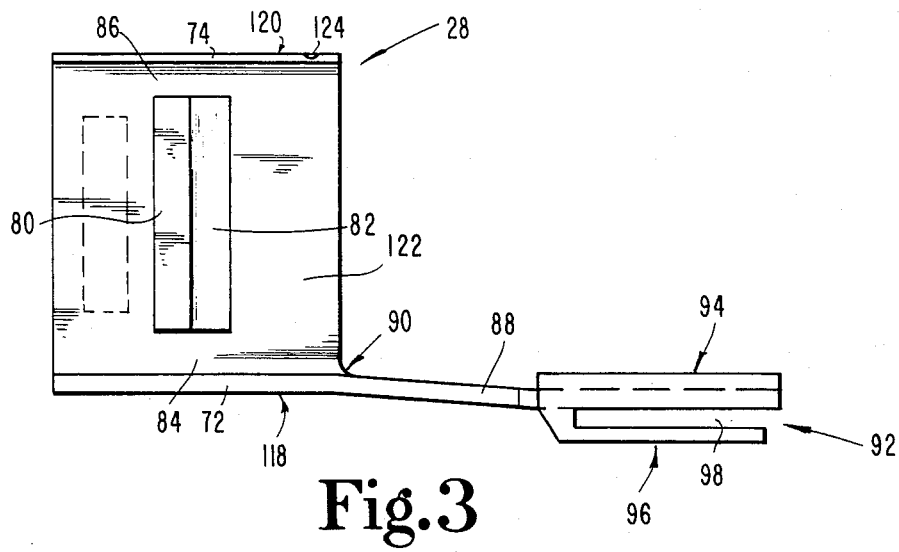
FIG. 3 is a bottom view of the moveable member 28 of FIG. 1.
Figure 4:
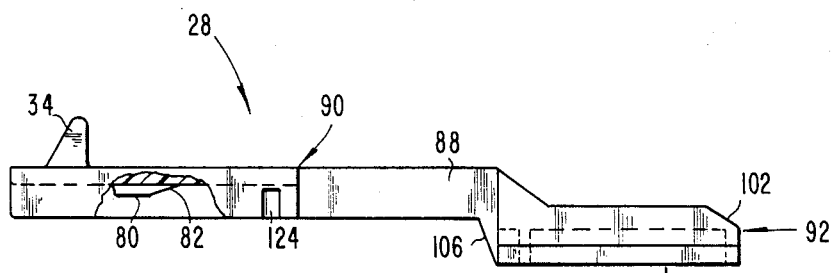
FIG. 4 is a partially segmented side view of the moveable member 28 of FIG. 1.
Figure 5:
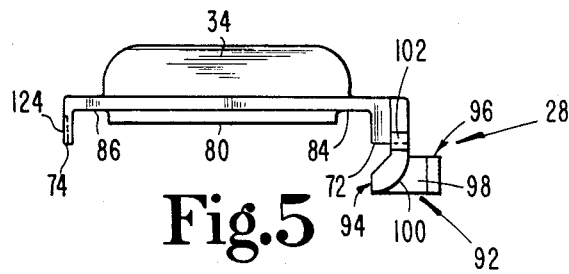
FIG. 5 is an end view of the moveable member 28 of FIG. 1.

Referring to FIGS. 3, 4, and 5, moveable member 28 is provided with a tongue 80 that includes a sloped surface 82 disposed toward the retractor 24. Such tongue 80 is of a lateral dimension corresponding to the lateral dimension of tongue 64 of base member 26, and tongue 80 is of a lateral dimension less than the corresponding interior lateral dimension of moveable member 28, thereby defining channels 84 and 86.

Moveable member 28 is also provided with a rigid rod 88 with a first end portion 90 and a second end portion 92. Second end portion 92 is provided with two rigid branches 94 and 96 that form a two-pronged fork. When moveable member 28 is positioned atop and within base member 26 as described above, space 98 between rigid branches 94 and 96 receives the end wall of retractor housing 36 as shown in FIGS. 1, 2 and 10. Referring to FIGS. 5, 1, 2 and 10, the curved outwardly-facing surface 100 of rigid branch 94 conforms to and slideably contacts the curved inner surface formed at the juncture of the side wall and bottom wall of retractor housing 36. Rigid branch 96 is aligned in planar relationship with rigid branch 94 along the outer surface of the side wall of retractor housing 36. Referring to FIGS. 4 and 10, when moveable member 28 is positioned atop base member 26 in the manner described, slanted surface 102 on rigid branch 94 is in direct contact with tab 104 of cam plate 44, as shown in FIG. 10 in the belt unlocked position, to be described below.

Referring to FIGS. 1 and 2, moveable member 28 is further provided with tongue 34 that extends in a direction away from base member 26 and protrudes through opening 32 in boot 22, tongue 34 being operable to slide moveable member 28 longitudinally along lines 76—76 and 78—78 on and within base member 26.

Figure 8:
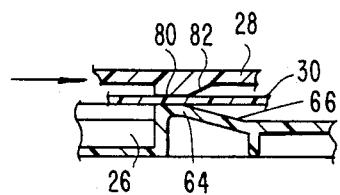
FIG. 8 is a fragmentary, cross-sectional view of the moveable member 28, base member 26, and belt 30 of FIG. 1 in the locking position, taken along line 8—8 and viewed in the direction of the arrows.
Figure 9:
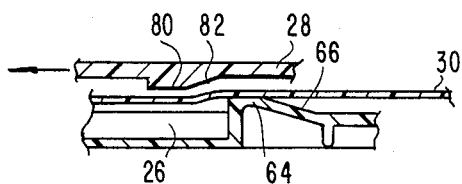
FIG. 9 is a fragmentary, cross-sectional view of the moveable member 28, base member 26, and belt 30 of FIG. 1 in the unlocking position, taken along line 9—9 and viewed in the direction of the arrows.

Referring to FIGS. 1 and 2, belt 30 is slideably disposed between base member 26 and moveable member 28. Referring now to FIGS. 8 and 9, when base member 26 and moveable member 28 are positioned together as described above, the tongue 80 of moveable member 28 is moveable longitudinally with respect to tongue 64 of base member 28 so as to define a belt locking position when tongue 80 is slideably aligned with tongue 64 in the manner shown in FIG. 8, in which position tongue 80 and tongue 64 pinchingly arrest belt 30 therebetween, and define a belt locking position. When tongue 80 is slideably disaligned with tongue 64 in the manner shown in FIG. 9, tongue 80 and tongue 64 free belt 30 to slideably pass therebetween. In the absence of belt 30 there is a space between tongue 80 and tongue 64 when they are aligned in the belt locking position shown in FIG. 8. This space is determined by the thickness of belt 30 and is to be selected in reference thereto such that tongues 80 and 64 can be aligned in the manner described and shown in FIG. 8 with belt 30 therebetween and provide sufficient frictional forces upon belt 30 to counterbalance the normal bias from spring 39 upon spring biased spool 38 of automatic retractor 24. Slanted surfaces 82 and 66 diverge relative to each other from the area of contact with belt 30 and are operable to facilitate movement of moveable member 28 and base member 26 into the belt locking and unlocking positions.

The outer limitations in the longitudinal movement of moveable member 28 may be defined by the length of opening 32 in boot 22 that receives tongue 34. The belt locking and unlocking positions may therefore be defined in relation to the position of tongue 34 within opening 32. In the preferred embodiment, the belt unlocking position is defined by the maximum possible longitudinal movement of moveable member 28 in the direction of the arrow in FIG. 9. Maximum movement of moveable member 28 in this longitudinal direction is delimited when sloped surface 106 of rigid rod 88, shown in FIG. 4, comes into contact with sloped surface 108 of base member 26, shown in FIG. 11. When this occurs, tongue 80 of moveable member 28 and tongue 64 of base member 26 are in the relative positions shown in FIG. 9. In the preferred embodiment, the belt locking position is defined by inwardly projecting tab 116 on base member 26 and recess 124 on moveable member 28 that snappingly receive each other when the belt locking position has been achieved. Referring to FIG. 6, base member 26 includes a pair of spaced apart symmetrical sidewalls 110 and 112, joined by support surface 114. A tab 116 is provided on base member side wall 112 disposed between base member side walls 110 and 112. Referring to FIG. 3, moveable member 28 includes a pair of spaced apart symmetrical sidesalls 118 and 120 joined by support surface 122. Referring to FIGS. 3 and 4, a recess 124 is provided in moveable member side wall 120 to snappingly receive tab 116, and tab 116 and recess 124 are disposed upon base member 26 and moveable member 28, respectively, to define the belt locking position, shown in FIG. 8, when tab 116 and recess 124 are so aligned.

As described, tongues 80 and 64 of the base member 26 and moveable member 28, respectively, when in the belt locking position shown in FIG. 8, overcome the normal bias from spring 39 upon spring biased spool 38 and thus belt 30 would not be urged to retract onto spring biased spool 38 even if tension upon belt 30 were loosened during use, such as by extraordinary passenger kinetics of the type described above. Therefore, progressive cinching up of belt 30 is prevented by the belt locking means disclosed. However, the pinching tension upon belt 30 applied in the belt locking position, as shown in FIG. 8, could be overcome to permit belt 30 to be forcibly withdrawn from spring biased spool 38 is a user of belt 30 forcibly withdrew belt 30 from spring biased spool 38 while moveable member 26 and base member 26 were in the belt locking position. This might occur if tongue 34 were moved into the belt locking position before belt 30 was initially withdrawn from spring biased spool 38. However, as described above, automatic belt retractor 24 will not lock unless belt 30 is allowed to be retracted slightly unto spring biased spool 38 to permit cam plate tab 46 to rotate counterclockwise and thereby disengage contact with pawl bar 42 to allow pawl bar 42 to move into locking relationship with ratchet wheel 40. To prevent such inadvertent use of the belt locking means disclosed, rigid rod 88 is provided to manually rotate cam plate 44 counterclockwise every time the belt lock position is engaged, thereby disengaging the pawl bar from cam plate tab 46 and allowing pawl bar 42 to pivot into locking relationship with ratchet wheel 40. Referring to FIG. 10, rigid rod 88 is shown in relative position with cam plate 44 and cam plate tab 104 in the belt unlocking position. As moveable member 28 is moved into the belt locking position, slanted surface 102 of rigid branch 94 forcibly rotates cam plate tab 104 clockwise until belt locking position is achieved, at which point cam plate tab 46 has been rotated clockwise to a point at which it is completely and lockingly disengaged from pawl bar 42, and pawl bar 42 pivots to lockingly engage ratchet wheel 40 and thereby lock retractor 24.

Figure 11:
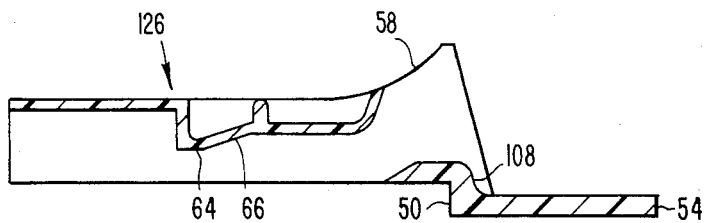
FIG. 11 is a cross-sectional side view of the base member 126 of an alternate embodiment of the belt retractor with belt retraction lock that is the present invention.
Figure 12:
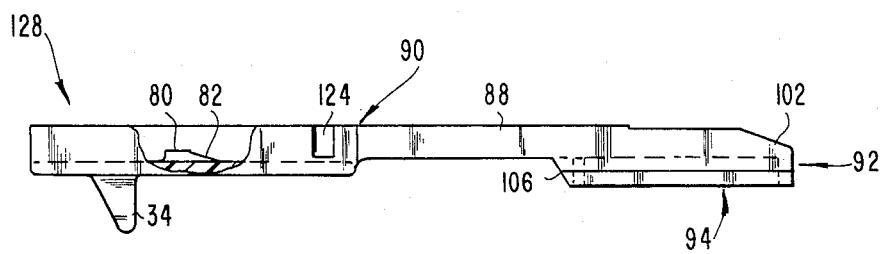
FIG. 12 is a partially segmented side view of the moveable member 128 of the alternate embodiment of the belt retractor with belt retraction lock that is the present invention.
Figure 13:
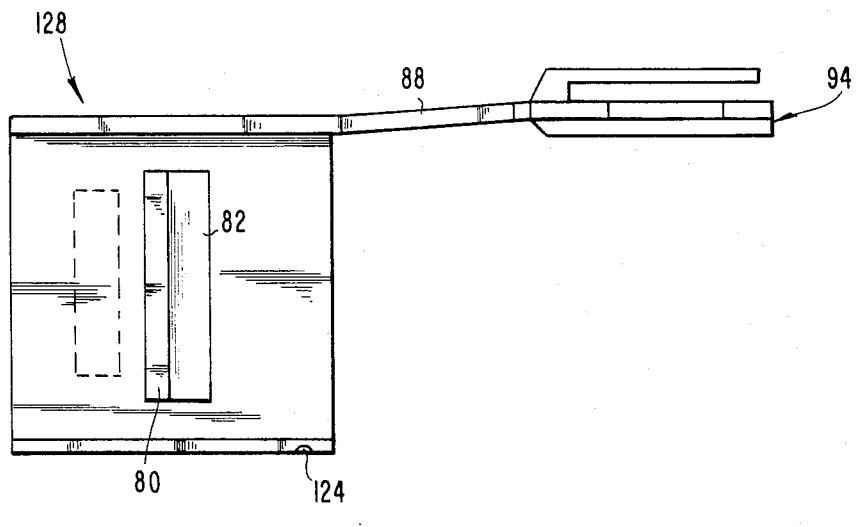
FIG. 13 is a top view of the moveable member 128 of FIG. 12.

In another embodiment of the present invention, the tongue 34 of moveable member 28 can be arranged to exit boot 22 through an opening identical to opening 32 shown in FIG. 1, but on the directly opposite surface of boot 22. This configuration in combination with the preferred embodiment provides a wider variety of applications of the belt retractor with belt lock disclosed. Referring to FIGS. 11, 12, and 13 there is shown the embodiments of the base member 126 (FIG. 11) and the moveable member 128 (FIGS. 12 and 13) for orienting the tongue 34 to exit on the opposite surface of boot 22 as that shown in FIG. 1, with corresponding part members of the preferred embodiment shown for identifying corresponding and similarly functioning parts of this embodiment. Thus, the prior description for base member 26 and moveable member 28 applies to base member 126 and member 128, with the general exceptions that support surface 122 and the constituent elements thereon of moveable member 28 have been inverted in forming moveable member 128, and that support surface 114 and the constituent elements thereon of base member 26 have been inverted in forming base member 126.

It is contemplated that the moveable member 28 (and 128) and base member 26 (and 126) may be manufactured from a sturdy plastic material that will give sufficient strength yet will be sufficiently yieldable to permit ideal operation of tab 116 and recess 124 to lockingly locate the belt locking position. As described, moveable member 28 (and 128) and base member 26 (and 126) are satisfactorily held in proper positioning by the confining relationship of boot 22 and automatic retractor 24, without the necessity of additional fastening devices. It is also contemplated that the base member 26 (and 126) and moveable member 28 (and 128) can be positioned together outside of boot 22 and then be snappingly emplaced within boot 22 through the widest opening of boot 22, boot 22 being yieldable to permit tongue 34 to be forcibly inserted into the narrowest portion of boot 22. This method of assembly would permit conversion of existing prior art boots 22. Alternatively, of course, moveable member 28 (and 128) and base member 26 (and 126) may be incorporated within boot 22 during the manufacture of boot 22.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An automatic belt retractor with belt retraction lock for installation in a motor vehicle, comprising:
   a boot;
   a belt;
   an automatic belt retractor mounted within said boot and including a housing, a spring biased spool rotatably mounted within said housing wrappingly receiving said belt and normally urging said belt to a retracted condition but yieldable to permit withdrawal of said belt, said spool having end walls at least one of which is configured as a ratchet wheel, a spring biased pawl bar pivotally mounted within said housing moveable between a removed position and a locking position whereat said pawl bar lockingly engages said ratchet wheel limiting movement of said spool and withdrawal of said belt, a cam plate mounted within said housing adjacent one of said walls and rotatably moveable therewith upon withdrawal of said belt to a first position whereat said cam plate contacts and blocks movement of said pawl bar to said locking position, and moveable therewith upon slight retraction of said belt to a second position whereat said cam plate disengages contact and allows movement of said pawl bar to said locking position;
   belt retraction locking means mounted within said boot to lockingly but releasably engage said belt counterbalancing said spring bias of said spool and deactivating said spool's normal urging of said belt to a retracted condition;
   and cam-rotating means to lockingly but releasably rotate said cam plate to said second position concurrently with said belt retraction means lockingly engaging said belt.

2. The automatic belt retractor with belt retraction lock of claim 1 wherein:
   said locking means includes a base member and a moveable member that is slideably received in said base member and between which said belt is disposed and slidingly passable, a first surface on said base member and a second surface on said moveable member, said base member and said moveable member defining a belt locking position when said second surface is slideably aligned with said first surface, said belt being arrested therebetween, and defining a belt unlocking position when said second surface is slideably disaligned with said first surface, said belt being slidingly passable therebetween.

3. The automatic belt retractor with belt retraction lock of claim 2 wherein:
   said base member has a first tongue mounted thereon and extending toward said moveable member, said moveable member has a second tongue mounted thereon and extending toward said base member, said first tongue includes said first surface which is sloped and disposed toward said belt retractor and said second tongue includes said second surface which is sloped and disposed toward said belt retractor.

4. The automatic belt retractor with belt retraction lock of claim 2 wherein:
   said base member includes a pair of spaced apart symmetrical base-member sidewalls joined therebetween by a first support surface, and said moveable member includes a pair of spaced apart symmetrical moveable-member sidewalls joined therebetween by a second support surface, at least one of said base-member sidewalls and said moveable-member sidewalls being provided with a tab-recess combination to snappingly receive and lock together, said tab-recess combination being disposed to define said belt locking position when together.

5. The automatic belt retractor with belt retraction lock of claim 2 wherein:
   said moveable member includes a third tongue mounted to said moveable member and extending away from said base member and protruding through said boot, said boot being provided with an opening to receive said third tongue, said opening allowing said third tongue to be moveable with said moveable member between said belt locking position and said belt unlocking position.

6. The automatic belt retractor with belt retraction lock of claim 4 wherein:

said cam-rotating means includes a rigid rod with a first end portion and a second end portion, said first end portion mounted to said moveable member sidewall in closest proximity to said cam plate disposing said rod toward said cam plate, said second end portion directly contacting said cam plate, said rod being moveable with said moveable member between said belt locking position and said belt unlocking position, said second end portion rotating said cam plate lockingly to said second position as said moveable member is moved to said belt locking position and permitting said cam plate to releasingly rotate from said second position as said moveable member moves from said belt locking position to said belt unlocking position.

7. The automatic belt retractor with belt retraction lock of claim 6 wherein:

said second end portion of said rigid rod is forked into a first rigid branch and a second rigid branch, said first branch contacting said cam plate, said second branch aligned in planar relationship with said first branch outside said retractor's housing.

8. An automatic belt retractor with belt retraction lock for installation in a motor vehicle, comprising:

a frame;
a belt;
an automatic belt retractor mounted to said frame and including a housing, a spring biased spool rotatably mounted within said housing wrappingly receiving said belt and normally urging said belt to a retracted condition but yieldable to permit withdrawal of said belt, said spool having end walls at least one of which is configured as a ratchet wheel, a spring biased pawl bar pivotally mounted within said retractor moveable between a removed position and a locking position whereat said pawl bar lockingly engages said ratchet wheel limiting movement of said spool and withdrawal of said belt, a cam plate mounted within said retractor adjacent one of said walls and rotatably moveable therewith upon withdrawal of said belt to a first position whereat said cam plate contacts and blocks movement of said pawl bar to said locking position, and moveable therewith upon slight retraction of said belt to a second position whereat said cam plate disengages contact and allows movement of said pawl bar to said locking position;
belt retraction locking means mounted to said frame to lockingly but releasably engage said belt counterbalancing said spring bias of said spool and deactivating said spool's normal urging of said belt to a retracted condition;
and means to lockingly but releasably rotate said cam plate to said second position concurrently with said belt retraction means lockingly engaging said belt.

9. An automatic belt retractor with belt retraction lock for installation in a motor vehicle, comprising:
a belt;
an automatic belt retractor including a housing, a spring biased spool rotatably mounted within said housing wrappingly receiving said belt and normally urging said belt to a retracted condition but yieldable to permit withdrawal of said belt, said spool having end walls at least one of which is configured as a ratchet wheel, a spring biased pawl bar pivotally mounted within said retractor moveable between a removed position and a locking position whereat said pawl bar lockingly engages said ratchet wheel limiting movement of said spool and withdrawal of said belt, a cam plate mounted within said retractor adjacent one of said walls and rotatably moveable therewith upon withdrawal of said belt to a first position whereat said cam plate contacts and blocks movement of said pawl bar to said locking position, and moveable therewith upon slight retraction of said belt to a second position whereat said cam plate disengages contact and allows movement of said pawl bar to said locking position;
belt retraction locking means to lockingly but releasably engage said belt counterbalancing said spring bias of said spool and deactivating said spool's normal urging of said belt to a retracted condition; and
means to lockingly but releasably rotate said cam plate to said second position concurrently with said belt retraction means lockingly engaging said belt.

10. A belt retractor lock for use with a retractor having a cam plate operable to lockingly but releasably engage a retractor-locking pawl and having a belt wound thereon, comprising:

belt retraction locking means including a base member and a moveable member that is slideably received in said base member and between which said belt is disposed and slidingly passable, a first surface on said base member and a second surface on said moveable member, said base member and said moveable member defining a belt locking position when said second surface is slideably aligned with said first surface, said belt being arrested therebetween, and defining a belt unlocking position when said second surface is slideably disaligned with said first surface, said belt being slidingly passable therebetween;
and cam-rotating means to lockingly but releasably rotate said cam plate to lock said retractor with said pawl concurrently with said belt retraction means lockingly engaging said belt and including a rigid rod with a first end portion and a second end portion, said first end portion mounted to said moveable member in closest proximity to said cam plate disposing said rod toward said cam plate, said second end portion directly contacting said cam plate, said rod being moveable with said moveable member between said belt locking position and said belt unlocking position, said second end portion rotating said cam plate to lockingly engage said retractor-locking pawl as said moveable member is moved to said belt locking position, and permitting said cam plate to rotate to releasably disengage said retractor-locking pawl as said moveable member moves from said belt locking position to said belt unlocking position.

* * * * *